US011450240B2

(12) United States Patent
Wild

(10) Patent No.: US 11,450,240 B2
(45) Date of Patent: Sep. 20, 2022

(54) ADHESIVE LABEL WITH WATER-BASED RELEASE COATING

(71) Applicant: Iconex LLC, Duluth, GA (US)

(72) Inventor: Martha Patricia Wild, Duluth, GA (US)

(73) Assignee: Iconex LLC, Duluth, GA (US)

( * ) Notice: Subject to any disclaimer, the term of this patent is extended or adjusted under 35 U.S.C. 154(b) by 252 days.

(21) Appl. No.: 16/436,526

(22) Filed: Jun. 10, 2019

(65) Prior Publication Data

US 2019/0318666 A1 Oct. 17, 2019

Related U.S. Application Data

(63) Continuation of application No. 15/350,660, filed on Nov. 14, 2016, now Pat. No. 10,366,633, which is a
(Continued)

(51) Int. Cl.
| | | |
|---|---|---|
| *G09F 3/10* | (2006.01) | |
| *G09F 3/02* | (2006.01) | |
| *C09J 7/35* | (2018.01) | |
| *C09J 7/40* | (2018.01) | |
| *C09J 7/22* | (2018.01) | |

(Continued)

(52) U.S. Cl.
CPC ............... *G09F 3/10* (2013.01); *C09J 7/201* (2018.01); *C09J 7/21* (2018.01); *C09J 7/22* (2018.01); *C09J 7/35* (2018.01); *C09J 7/401* (2018.01); *G09F 3/02* (2013.01); *C09J 2203/334* (2013.01); *C09J 2400/20* (2013.01); *C09J 2400/283* (2013.01); *C09J 2403/005* (2013.01); *G09F 2003/0201* (2013.01);
(Continued)

(58) Field of Classification Search
CPC ...... G09F 3/10; G09F 3/02; G09F 2003/0201; G09F 2003/0202; G09F 2003/023; G09F 2003/0257
See application file for complete search history.

(56) References Cited

U.S. PATENT DOCUMENTS

| | | |
|---|---|---|
| 3,690,924 A | 9/1972 | Estes |
| 3,933,702 A | 1/1976 | Caimi et al. |

(Continued)

FOREIGN PATENT DOCUMENTS

| | | |
|---|---|---|
| GB | 2170755 A | 8/1986 |
| WO | WO-0185865 A1 | 11/2001 |
| WO | WO-2007136767 A2 | 11/2007 |

OTHER PUBLICATIONS

Unidyne products from the Daikin website; "Oil and Grease Barrier" <https://www.daikinchem.de/products-and-performance/oil-and-grease-barrier>.*

(Continued)

*Primary Examiner* — Laura C Powers
(74) *Attorney, Agent, or Firm* — Schwegman Lundberg & Woessner, P.A.

(57) ABSTRACT

An adhesive label with a water-based release coating and methods for applying the water-based release coating to the adhesive label are provided. The water-based release coating is a non-silicon based formulation having a fluorochemical. The water-based release coating can be applied in a single-pass process or a double-pass process when manufacturing the adhesive label.

19 Claims, 5 Drawing Sheets

Related U.S. Application Data continuation of application No. 14/192,997, filed on Feb. 28, 2014, now Pat. No. 9,495,888.

(60) Provisional application No. 61/914,213, filed on Dec. 10, 2013.

(51) Int. Cl.
  *C09J 7/20* (2018.01)
  *C09J 7/21* (2018.01)

(52) U.S. Cl.
  CPC ............ *G09F 2003/0202* (2013.01); *G09F 2003/023* (2013.01); *G09F 2003/0257* (2013.01); *Y10T 428/2839* (2015.01)

(56) References Cited

U.S. PATENT DOCUMENTS

| | | | |
|---|---|---|---|
| 4,021,365 A | 5/1977 | Sinka et al. | |
| 4,053,433 A | 10/1977 | Lee | |
| 4,624,893 A | 11/1986 | Shibano et al. | |
| 5,102,733 A | 4/1992 | Zawadzki | |
| 5,661,099 A * | 8/1997 | Mitchell, Jr. | B41M 5/42 156/252 |
| 5,672,428 A | 9/1997 | Muschelweicz et al. | |
| 5,824,748 A | 10/1998 | Kesti et al. | |
| 5,877,252 A | 3/1999 | Tsujimoto et al. | |
| 6,074,747 A | 6/2000 | Scholz et al. | |
| 6,432,528 B1 | 8/2002 | Faust et al. | |
| 6,472,468 B1 | 10/2002 | Omura et al. | |
| 6,613,430 B2 | 9/2003 | Culbertson et al. | |
| 7,329,449 B2 | 2/2008 | Wiklof et al. | |
| 7,411,020 B2 | 8/2008 | Carlson et al. | |
| 8,147,643 B1 | 4/2012 | Valenti, Jr. et al. | |
| 8,445,104 B2 | 5/2013 | Vigunas et al. | |
| 9,495,888 B2 | 11/2016 | Wild | |
| 9,830,837 B2 | 11/2017 | Wild et al. | |
| 10,510,270 B2 | 12/2019 | Wild et al. | |
| 10,550,293 B2 | 2/2020 | Wild et al. | |
| 10,920,114 B2 | 2/2021 | Wild et al. | |
| 2002/0058458 A1 | 5/2002 | Lee et al. | |
| 2002/0079121 A1 | 6/2002 | Ryan et al. | |
| 2002/0136912 A1 | 9/2002 | Irick, Jr. | |
| 2003/0077427 A1 | 4/2003 | Cates et al. | |
| 2003/0109630 A1 | 6/2003 | Smith et al. | |
| 2004/0067088 A1 * | 4/2004 | Kline | B41J 11/005 400/615.2 |
| 2005/0255298 A1 | 11/2005 | Crum | |
| 2006/0141194 A1 | 6/2006 | Carlson et al. | |
| 2007/0059472 A1 | 3/2007 | Kitchin | |
| 2007/0224398 A1 * | 9/2007 | Raksha | C09D 5/008 428/204 |
| 2007/0267146 A1 | 11/2007 | Vigunas et al. | |
| 2008/0118694 A1 | 5/2008 | Crum | |
| 2009/0020245 A1 | 1/2009 | Garcia Juez et al. | |
| 2010/0300613 A1 | 12/2010 | Stogbauer et al. | |
| 2011/0061802 A1 * | 3/2011 | Raming | G09F 3/10 156/256 |
| 2011/0160376 A1 | 6/2011 | Hori et al. | |
| 2013/0260991 A1 | 10/2013 | Van Boom et al. | |
| 2015/0159034 A1 | 6/2015 | Wild et al. | |
| 2015/0159054 A1 | 6/2015 | Wild et al. | |
| 2015/0161915 A1 | 6/2015 | Wild | |
| 2015/0161916 A1 | 6/2015 | Wild et al. | |
| 2017/0166781 A1 | 6/2017 | Wild | |
| 2018/0012521 A1 | 1/2018 | Wild et al. | |
| 2020/0157389 A1 | 5/2020 | Wild et al. | |
| 2020/0193875 A1 | 6/2020 | Wild et al. | |

OTHER PUBLICATIONS

Unidyne products from the Daikin website; "Water Oil Repellency" < https://www.daikinchem.de/products-and-performance/water-oil-repellency>.*

"U.S. Appl. No. 14/192,997, Non Final Office Action dated May 21, 2015", 12 pgs.

"U.S. Appl. No. 14/192,997, Notice of Allowance dated Mar. 28, 2016", 11 pgs.

"U.S. Appl. No. 14/192,997, Notice of Allowance dated Nov. 2, 2015", 10 pgs.

"U.S. Appl. No. 14/192,997, Response filed May 4, 2015 to Restriction Requirement dated Apr. 27, 2015", 1 pg.

"U.S. Appl. No. 14/192,997, Response filed Aug. 21, 2015 to Non Final Office Action dated May 21, 2015", 7 pgs.

"U.S. Appl. No. 14/192,997, Restriction Requirement dated Apr. 27, 2015", 7 pgs.

"U.S. Appl. No. 14/305,719, Advisory Action dated Feb. 12, 2016", 3 pgs.

"U.S. Appl. No. 14/305,719, Advisory Action dated Dec. 20, 2016", 3 pgs.

"U.S. Appl. No. 14/305,719, Corrected Notice of Allowance dated Aug. 25, 2017", 4 pgs.

"U.S. Appl. No. 14/305,719, Final Office Action dated Oct. 6, 2016", 16 pgs.

"U.S. Appl. No. 14/305,719, Final Office Action dated Nov. 4, 2015", 18 pgs.

"U.S. Appl. No. 14/305,719, Non Final Office Action dated Mar. 28, 2017", 17 pgs.

"U.S. Appl. No. 14/305,719, Non Final Office Action dated Jun. 1, 2016", 18 pgs.

"U.S. Appl. No. 14/305,719, Non Final Office Action dated Jun. 25, 2015", 16 pgs.

"U.S. Appl. No. 14/305,719, Notice of Allowance dated Jul. 18, 2017", 14 pgs.

"U.S. Appl. No. 14/305,719, Response filed Jan. 11, 2016 to Final Office Action dated Nov. 4, 2015", 7 pgs.

"U.S. Appl. No. 14/305,719, Response filed May 4, 2015 to Restriction Requirement dated Apr. 27, 2015", 1 pgs.

"U.S. Appl. No. 14/305,719, Response filed Jun. 28, 2017 to Non Final Office Action dated Mar. 28, 2017", 7 pgs.

"U.S. Appl. No. 14/305,719, Response filed Sep. 1, 2016 to Non Final Office Action dated Jun. 1, 2016", 7 pgs.

"U.S. Appl. No. 14/305,719, Response filed Sep. 24, 2015 to Non Final Office Action dated Jun. 25, 2015", 9 pgs.

"U.S. Appl. No. 14/305,719, Response filed Dec. 6, 2016 to Final Office Action dated Oct. 6, 2016", 8 pgs.

"U.S. Appl. No. 14/305,719, Restriction Requirement dated Apr. 27, 2015", 7 pgs.

"U.S. Appl. No. 14/305,872, Advisory Action dated Mar. 15, 2016", 3 pgs.

"U.S. Appl. No. 14/305,872, Advisory Action dated Jun. 2, 2017", 2 pgs.

"U.S. Appl. No. 14/305,872, Advisory Action dated Nov. 17, 2016", 3 pgs.

"U.S. Appl. No. 14/305,872, Final Office Action dated Mar. 21, 2017", 10 pgs.

"U.S. Appl. No. 14/305,872, Final Office Action dated Jun. 13, 2018", 10 pgs.

"U.S. Appl. No. 14/305,872, Final Office Action dated Aug. 26, 2016", 11 pgs.

"U.S. Appl. No. 14/305,872, Final Office Action dated Nov. 8, 2017", 11 pgs.

"U.S. Appl. No. 14/305,872, Final Office Action dated Dec. 31, 2015", 8 pgs.

"U.S. Appl. No. 14/305,872, Non Final Office Action dated Feb. 22, 2018", 9 pgs.

"U.S. Appl. No. 14/305,872, Non Final Office Action dated May 2, 2016", 9 pgs.

"U.S. Appl. No. 14/305,872, Non Final Office Action dated Jul. 20, 2017", 10 pgs.

"U.S. Appl. No. 14/305,872, Non Final Office Action dated Sep. 15, 2015", 8 pgs.

"U.S. Appl. No. 14/305,872, Non Final Office Action dated Dec. 8, 2016", 9 pgs.

"U.S. Appl. No. 14/305,872, Response filed Jan. 9, 2018 to Final Office Action dated Nov. 8, 2017", 7 pgs.

(56) References Cited

OTHER PUBLICATIONS

"U.S. Appl. No. 14/305,872, Response filed Feb. 29, 2016 to Final Office Action dated Dec. 31, 2015", 6 pgs.
"U.S. Appl. No. 14/305,872, Response filed Mar. 3, 2017 to Non Final Office Action dated Dec. 8, 2016", 9 pgs.
"U.S. Appl. No. 14/305,872, Response filed May 22, 2018 to Non Final Office Action dated Feb. 22, 2018", 8 pgs.
"U.S. Appl. No. 14/305,872, Response filed May 23, 2017 to Final Office Action dated Mar. 21, 2017", 7 pgs.
"U.S. Appl. No. 14/305,872, Response filed Aug. 2, 2016 to Non Final Office Action dated May 2, 2016", 6 pgs.
"U.S. Appl. No. 14/305,872, Response filed Aug. 5, 2015 to Restriction Requirement dated Jul. 29, 2015", 1 pg.
"U.S. Appl. No. 14/305,872, Response filed Oct. 18, 2017 to Non Final Office Action dated Jul. 20, 2017", 7 pgs.
"U.S. Appl. No. 14/305,872, Response filed Oct. 31, 2016 to Final Office Action dated Aug. 26, 2016", 7 pgs.
"U.S. Appl. No. 14/305,872, Response filed Dec. 15, 2015 to Non Final Office Action dated Sep. 15, 2015", 6 pgs.
"U.S. Appl. No. 14/305,872, Restriction Requirement dated Jul. 29, 2015", 5 pgs.
"U.S. Appl. No. 14/305,911, Advisory Action dated Dec. 5, 2016", 6 pgs.
"U.S. Appl. No. 14/305,911, Final Office Action dated Sep. 9, 2016", 13 pgs.
"U.S. Appl. No. 14/305,911, Final Office Action dated Dec. 3, 2015", 15 pgs.
"U.S. Appl. No. 14/305,911, Final Office Action dated Dec. 27, 2017", 21 pgs.
"U.S. Appl. No. 14/305,911, Non Final Office Action dated Mar. 10, 2016", 15 pgs.
"U.S. Appl. No. 14/305,911, Non Final Office Action dated Mar. 21, 2018", 18 pgs.
"U.S. Appl. No. 14/305,911, Non Final Office Action dated Aug. 7, 2017", 16 pgs.
"U.S. Appl. No. 14/305,911, Non Final Office Action dated Aug. 14, 2015", 21 pgs.
"U.S. Appl. No. 14/305,911, Response filed Feb. 10, 2016 to Final Office Action dated Dec. 3, 2015", 8 pgs.
"U.S. Appl. No. 14/305,911, Response filed Feb. 27, 2018 to Final Office Action dated Dec. 27, 2017", 9 pgs.
"U.S. Appl. No. 14/305,911, Response filed Jun. 10, 2016 to Non Final Office Action dated Mar. 10, 2016", 8 pgs.
"U.S. Appl. No. 14/305,911, Response filed Jun. 21, 2018 to Non Final Office Action dated Mar. 21, 2018", 8 pgs.
"U.S. Appl. No. 14/305,911, Response filed Nov. 7, 2017 to Non Final Office Action dated Aug. 7, 2017", 8 pgs.
"U.S. Appl. No. 14/305,911, Response filed Nov. 10, 2016 to Final Office Action dated Sep. 9, 2016", 7 pgs.
"U.S. Appl. No. 14/305,911, Response filed Nov. 16, 2015 to Non Final Office Action dated Aug. 14, 2015", 8 pgs.
"U.S. Appl. No. 14/305,911, Response filed Dec. 9, 2016 to Advisory Action dated Dec. 5, 2016", 8 pgs.
"U.S. Appl. No. 15/350,660, 312 Amendment filed Mar. 14, 2019", 6 pgs.
"U.S. Appl. No. 15/350,660, Advisory Action dated Oct. 9, 2018", 3 pgs.
"U.S. Appl. No. 15/350,660, Corrected Notice of Allowability dated Mar. 29, 2019", 6 pgs.
"U.S. Appl. No. 15/350,660, Final Office Action dated Jul. 17, 2018", 25 pgs.
"U.S. Appl. No. 15/350,660, Non Final Office Action dated Feb. 14, 2018", 22 pgs.
"U.S. Appl. No. 15/350,660, Notice of Allowance dated Mar. 8, 2019", 14 pgs.
"U.S. Appl. No. 15/350,660, Preliminary Amendment filed Feb. 28, 2017", 6 pgs.
"U.S. Appl. No. 15/350,660, Response filed May 14, 2018 to Non Final Office Action dated Feb. 14, 2018 filed May 14, 2018", 9 pgs.
"U.S. Appl. No. 15/350,660, Response filed Sep. 26, 2018 to Final Office Action dated Jul. 17, 2018", 8 pgs.
"U.S. Appl. No. 15/710,184, Preliminary Amendment filed Sep. 21, 2017", 5 pgs.
"European Application Serial No. 14197066.5, Communication Pursuant to Article 94(3) EPC dated Apr. 4, 2018", 4 pgs.
"European Application Serial No. 14197066.5, Extended European Search Report dated May 11, 2015", 6 pgs.
"European Application Serial No. 14197066.5, Response filed Jul. 10, 2015 to Extended European Search Report dated May 11, 2015", 7 pgs.
"European Application Serial No. 14197066.5, Response filed Jul. 27, 2018 to Communication Pursuant to Article 94(3) EPC dated Apr. 4, 2018", w/ English Claims, 12 pgs.
"European Application Serial No. 15152022.8, Communication pursuant to Rule 69 EPC dated Aug. 1, 2016", 2 pgs.
"European Application Serial No. 15152022.8, European Search Report dated Jul. 6, 2015", 6 pgs.
"European Application Serial No. 15152022.8, Response filed Sep. 18, 2015 to European Search Report dated Jul. 6, 2015", 8 pgs.
"Silane Chemical Compound", Britannica.com. [Online]. Retrieved from the Internet: <https://www.britannica.com/science/silane>, (Jul. 20, 1998), 1 pg.
"Silicon or Silicone: What's the Difference?", by Joseph Castro, Live Science Contributor;, [Online] Retrieved from the internet: <https://www.livescience.com/37598-silicon-or-silicone-chips-implants.html>, (Jun. 20, 2013), 1 pg.
"Unidyne Oil & Grease Barrier for Paper", (c) 2017 Daikin Chemical Europe GmbH [online]. Retrieved from the Internet: <https://www.daikinchem.de/products-and-performance/oil-and-grease-barrier>, (2017), 3 pgs.
"Water Repellent Treatment Unidyne", (c) 2017 Daikin Chemical Europe GmbH [online]. Retrieved from the Internet: <https://www.daikinchem.de/products-and-performance/water-oil-repellency>, (2017), 4 pgs.
U.S. Appl. No. 14/192,997, U.S. Pat. No. 9,495,888, filed Feb. 28, 2014, Adhesive Label With Water-Based Release Coating.
U.S. Appl. No. 15/350,660, filed Nov. 14, 2016, Adhesive Label With Water-Based Release Coating.
U.S. Appl. No. 14/305,719, U.S. Pat. No. 9,830,837, filed Jun. 16, 2014, Label With Adhesive and Silicone-Free Release Coating.
U.S. Appl. No. 15/710,184, filed Sep. 20, 2017, Label With Adhesive and Silicone-Free Release Coating.
U.S. Appl. No. 14/305,872, filed Jun. 16, 2014, Label With Adhesive and Silicone-Free Release Coating.
U.S. Appl. No. 14/305,911, filed Jun. 16, 2014, Label With Adhesive and Silicone-Free Release Coating.

* cited by examiner

ADHESIVE LABEL WITH WATER-BASED RELEASE COATING

RELATED REFERENCE

The present application is a continuation of U.S. patent application Ser. No. 15/350,660, filed Nov. 14, 2016 which is a continuation of U.S. patent application Ser. No. 14/192,997, filed Feb. 28, 2014, now U.S. Pat. No. 9,495,888, Issue Date Nov. 15, 2016, which is a non-provisional of and claims priority to U.S. Provisional No. 61/914,213, entitled "Adhesive Label with Water-Based Release Coating," filed on Dec. 10, 2013; the disclosure of which are incorporated by reference herein in their entirety.

BACKGROUND

The ubiquitous adhesive label is available in a myriad of configurations for use in various applications, including specialty applications. The typical an adhesive label includes pressure-sensitive adhesive on its back side and initially laminated to an underlying release liner. The release liner typically has a release coating to provide a weak bond with the adhesive for permitting the individual removal of labels from the liner when desired.

Adhesive labels may be found in individual sheets, or joined together in a fan-fold stack, or in a continuous roll. Label rolls are typically used in commercial applications requiring high volume use of labels.

One type of label roll may be in the form of a web and does not include a liner sheet. Such label rolls are known as linerless label rolls. The labels may be formed of thermal paper for sequential printing of individual labels in a direct thermal printer. Or, a thermal transfer printer may also be used. The front surface of the label web may be coated with a release coating. In the fast food industry, linerless labels may be used in identifying individual food products in typical sales transactions.

A preferred release coating for use with all types of adhesive labels is silicone. However, silicone is perceived to be environmentally unfriendly.

Therefore, it would be desirable to provide an adhesive label with an alternative release coating than silicone.

SUMMARY

In various embodiments, an adhesive label and non-silicon based release coating and methods of applying the non-silicon based release coating are provided.

An example adhesive label includes a substrate, an adhesive on a first surface of the substrate, and a water-based release coating applied to a second surface of the substrate with a formulation including a fluorochemical.

The substrate can be paper, such as a base paper, a single layer coated paper, a several layer coated paper, a thermal coated paper, a top coated paper (over the thermal coating), film, or any other substrate that can receive coated layers.

The fluorochemical can be coated directly onto the substrate, mixed into a body of release coatings, or as a component in a mixture containing one or more of the following chemicals: starch, polyvinyl alcohol (PVOH), polyvinyl acetate (PVA), sizing agent, clay, silica, precipitated calcium carbonate (PCC), thickener, and rheology modifier.

DETAILED DESCRIPTION

Figure 1:
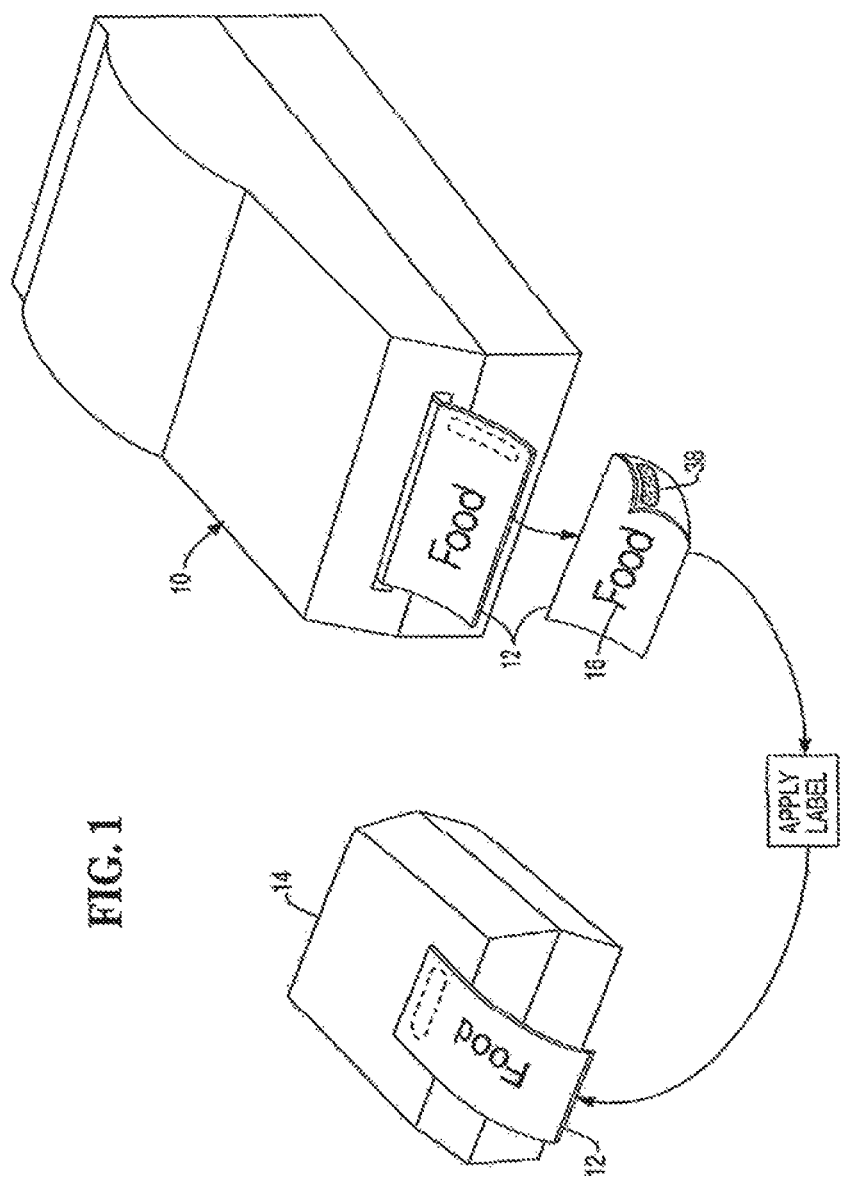
FIG. 1 is a view of a thermal printer dispensing pressure sensitive labels having a release coating, according to an embodiment.

FIG. 1 is a view of a thermal printer dispensing pressure sensitive labels having a release coating, according to an embodiment. With reference to FIG. 1, a printer 10 configured for printing in sequence individual labels 12 for use in a typical fast food application. For example, food may be placed in a suitable food package 14 such as the paper box illustrated, or simple wrapping paper. Printer 10 may include a thermal printer, such as a single or double-sided thermal printer (as shown in the FIG. 6).

Print or identifying indicia 16 is printed on a label 12 in printer 10 for identifying the contents of the package, for example. The individual printed label 12 may then be removed from printer 10 and applied using the adhesive 38 to the food package 14 as illustrated in the a method (12 printed from 10 to 16 to APPLY LABEL to 12 applied to 14 using 38 (adhesive patch), which is shown in FIG. 1.

Figure 2:
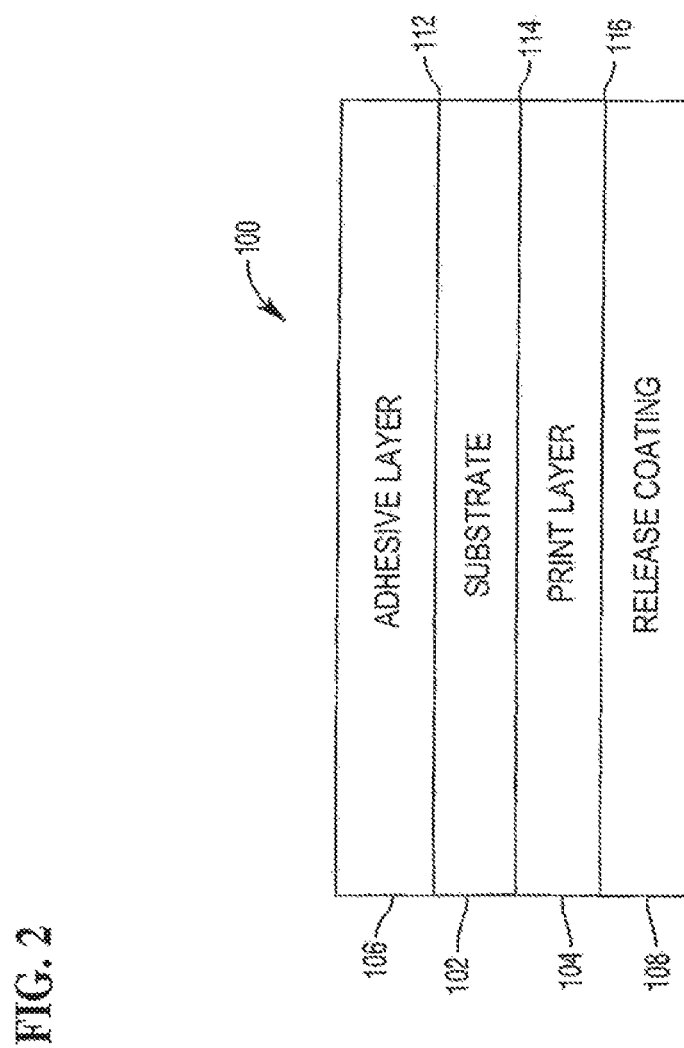
FIG. 2 is a cross-sectional view of a linerless label, according to an embodiment.
Figure 3:
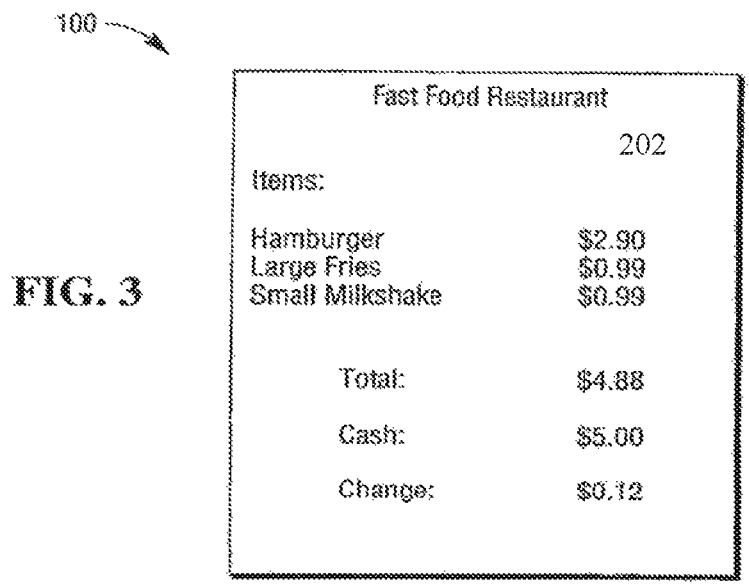
FIG. 3 is a view of a second surface of the linerless label of FIG. 2, including printed text, according to an embodiment.
Figure 4:
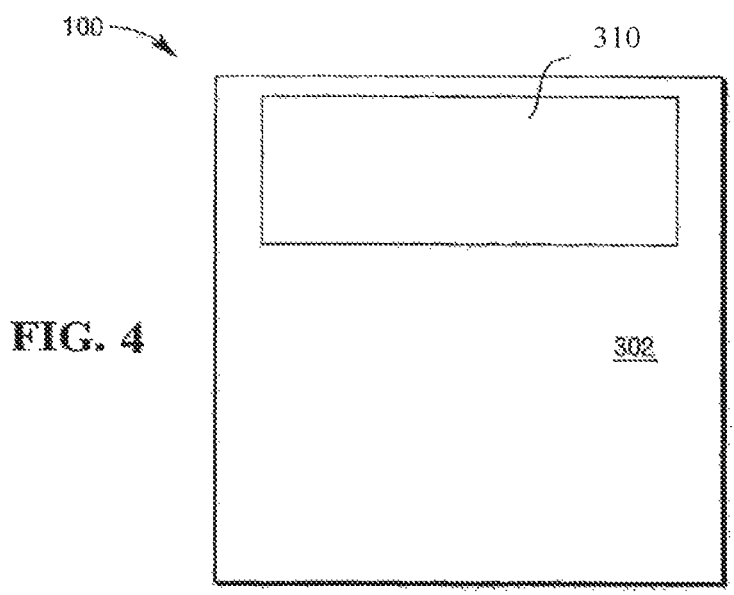
FIG. 4 is a view of a first surface of the linerless label of FIG. 2, including a strip of activated adhesive, according to an embodiment.

FIGS. 2-4 illustrate an example linerless label 100 that includes a printable surface including imaging material on one side and a heat-activated adhesive surface on the other side having a release coating, according to embodiments of the invention. It is to be noted that other types of labels are also envisioned.

FIG. 2 is a cross-sectional view of a linerless label having a release coating, according to an embodiment.

With reference to FIG. 2, linerless label 100 is formed of layers including a substrate 102, a thermal print layer 104, a heat-activated adhesive layer 106, and a release coating 108. The adhesive layer 106 overlies a first surface 112 of the substrate 102 and the print layer 104 overlies a second surface 114 of the substrate 102 of the print layer 104. The release coating 108 overlies surface 116 of the print layer 104.

In some embodiments, substrates may be thermally resistant in order to prevent heat applied to one side of the substrate from activating materials on the other side of the substrate.

Linerless label 100 may be wound into a roll. The adhesive layer 106 comes into contact with the release coating 108, thereby minimizing adhesion between the adhesive layer 106 and the print layer 104 or underlying substrate 102.

The print layer 104 can include one or more layers of thermal imaging material. For instance, the print layer 104 can include a thermal transfer receptive coating suitable for thermal transfer printing. Alternately or additionally, the print layer 104 may include one or more thermally sensitive coatings which are adapted to change color upon application of heat thereto by which direct thermal printing is provided.

The adhesive layer 106 may include water based adhesives and may be applied in patches using a printing press.

As an alternative to using a separate print layer 104, substrate 102 could comprise thermochromic paper. A thermal print head can print visible patterns on thermochromic paper without requiring an additional print layer to be formed on the substrate.

FIG. 3 is a view of a second surface of the linerless label of the FIG. 2, including an example printed or imaged text, according to an embodiment.

That is, FIG. 3 illustrates an example of a second surface 202 of the linerless label 100 after printing. In this example, the label 100 is a receipt for a fast food meal. As shown in FIG. 2, the second surface 202 of the linerless label 100 has been printed with transaction information by, for example, direct thermal printing of one or more thermally sensitive compounds in the print layer 104.

FIG. 4 is a view of a first surface of the linerless label of FIG. 2, including a strip of activated adhesive, according to an embodiment.

The first surface 302 includes a wet adhesive portion in the form of a tacky strip 310 of heat-activated adhesive material that has been activated by, for example, a thermal print head. In this example, the tacky strip 310 can be used to attach the receipt to an associated bag of food. Consequently, the bag and the receipt can be handed to a customer simultaneously.

The tacky strip 310 can be formed in one of at least two different methods. In the first method, the entire first surface 112 of the substrate 102 can be overlaid by a heat-activated adhesive that is dry and non-tacky prior to activation. Then, only a selected portion of the heat-activated adhesive, the portion defining the strip 310, is activated by heat applied with a thermal print head. Depending on the embodiment, such activation may occur at or substantially at the same time as, or at some time after the second surface 202 of the receipt has been printed with transaction information. In the second method, a portion of the first surface 302 defining the strip 310 can be overlaid with a heat-activated adhesive that is dry and non-tacky prior to use. The entire heat-activated adhesive can be activated by a thermal print head, which activation may, depending on the embodiment, occur at or substantially at the same time as, or at some time after the second surface 202 of the receipt has been printed with transaction information. Either manner will result in a tacky adhesive strip 310. When a double-sided thermal printer is used, a first thermal print head can print on the second surface 202 of the receipt while a second thermal print head activates the first surface 302 of the receipt.

In the illustrated embodiment, a water-based release coating formulation 108 is used, instead of a silicone release coating. Water-based release coatings have been designed to be applied in a conventional coater such as a rod metering or puddle size press, a blade coater or any other coater capable of spreading the coating uniformly. However, application of the release coating is illustrated herein using a press rather than a conventional coater.

It is to be noted that there are significant differences between a silicone coating and the body of release coatings 108 that are being suggested as replacement. The silicone is 100% solids and cures with Ultraviolet (UV) energy in a short period of time. The body of available release coatings 108 has low percentage solids (in the range of 35% to 45%) and low viscosity (300 to 500 cps). Low solids need longer drying time at higher temperature. However, thermal paper cannot run at high temperature because the heat will pre-activate the thermal layer. Drying at low temperature using a water-based coating requires longer dwell time.

The water-based replacement release coating 108 is chosen from a body of release coatings. There have been several challenges to obtain a smooth and uniform coating layer applied on a substrate, where the substrate can be paper, such as a base paper, a single layer coated paper, a several layer coated paper, a thermal coated paper, a top coated paper (over the thermal coating), high temperature thermally coated paper, film, or any other substrate that can receive coated layer. The challenges have been exacerbated because of the thermal print layer on the substrate, which cannot be exposed to high temperatures. If the thermal print layer is heated above the activating temperature of the substrate, the thermal print layer will pre-image. The temperature range to dry this coating has to be carefully selected to be high enough to dry and cure the release coating 108 and low enough not to pre-image the thermal print layer. The challenge is that if the release coating 108 is still damp when the water-based adhesive is applied, both of these will come into contact with each other and this interaction will cause strong covalent bonds to form. The transfer of the wet adhesive to the surface of the wet release coating 108 causes contamination and renders both the adhesive and the release coating 108 ineffective. The adhesive may stick to the thermal print layer and can either remove the thermal print layer or rip the substrate if the adhesive-paper bond is too strong. As a result, the adhesive losses tack due to adhesive transfer to the substrate and the thermal print layer.

From a body of water-based release coatings such as grease resistant chemicals, more specific fluorochemicals (FC) are selected to chemically modify the release coating and meet the above challenges. The FC is water miscible and has a C-6 backbone. The chosen FC contains a hydrophilic and a hydrophobic tail.

FC can either be applied alone or in a coating formulation. Whether applied by itself or in the release coating formulation, the hydrophilic tail is anchored into the wet release coating or the underlying substrate while the hydrophobic tail remains outside the release coating, lining up to resemble a bed of nails and protecting the substrate from any liquid (water, oil, etc.) penetration. This FC is uniformly coated on the surface (as it has leveling properties).

Moreover, the FC improves the release coating by reducing the release force from a convention 0.12 lbf to an improved 0.045 lbf.

In addition, the FC also has the added attribute of accelerating the drying process when added on the surface of the substrate, thermal print layer coating or additional top coated layer. The FCs is made at around 20% solids, has the viscosity of water (1 g/cc) and is mixed in the release coating at 5 to 10 wet lb/ton of paper. The mixture of FC in the release coating (coating formulation) needs to be dried in a conventional dryer rather than with UV energy (used for silicone) and the temperature varies according to the coat weight of the release coating formulation. However, it is to be noted that when the substrate is a high-temperature thermally coated paper, the temperatures can be increased and correspondingly the high end range of temperatures listed in Table 1 can be increased to accelerate the drying times. The temperature ranges for the release coating formulation are based on the coat weight and percentage solids and are given in Table 1 below

TABLE 1

Dryer Temperature Range for the Coating Formulation
Dryer Temperature Range
for Coating Formulation

| T1 | T2 | T3 |
|---|---|---|
| 220 | 230 | 240 |
| 210 | 220 | 230 |
| 200 | 220 | 220 |
| 190 | 200 | 210 |
| 190 | 200 | 200 |
| 180 | 180 | 190 |
| 170 | 170 | 180 |
| 150 | 150 | 150 |

In one example application, the FC is added to the surface of the substrate. The FC can be coated directly onto the substrate, mixed into a body of release coatings, or as a component in a mixture containing one or more of the following chemicals: starch, polyvinyl alcohol (PVOH), polyvinyl acetate (PVA), sizing agent, clay, silica, precipitated calcium carbonate (PCC), thickener, and rheology modifier.

In an embodiment, the FC is mixed with just starch and coated directly onto the substrate.

In an embodiment, the FC is UNIDYNE TG-8151 distributed by Daikin, Industries, LTD.

The substrate can be paper, such as a base paper, a single layer coated paper, a several layer coated paper, a thermal coated paper, a top coated paper (over the thermal coating), film, or any other substrate that can receive coated layers.

Trials have shown that if the adhesive is applied within 24 hours of when the release coating was applied, the adhesive peels off when unwinding the linerless roll of labels. This is due to the interaction of the wet adhesive and wet release coating formulation during manufacturing. By adding the chosen FC to the coating formulation, a boundary layer is formed between the release coating formulation (containing the FC) and the adhesive. The wet release coating formulation with the FC's hydrophobic tails lining up on the surface of the release coating formulation serves as a barrier between the wet adhesive and the moist release coating formulation. The FC tails will repel the adhesive's liquid preventing it from penetrating into the release coating mixture. As both the release coating layer and adhesive dry, the hydrophilic side of the FC will migrate to the surface and will lay horizontally on the surface of the release coating protecting the release coating layer. The chosen FC will also accelerate the drying process. When the release coating formulation is dried, it will not only act as an adhesive barrier, but will also impart moisture, oil, and grease resistance protecting the linerless label from moisture and grease and oil stains.

In order to apply the example water-based release coating, one example method includes:

1. Using suitable anilox rolls to deliver between 1 and 8 wet gsm of release coating material. The anilox rolls capable of carrying this amount of liquid are in the range of 300 PLI/8.0 BCM and 400 PLI/6.5 BCM.

2. Drying all the excess water in the release coating, including running at much higher temperature without imaging the thermal coating. The drier temperature range is significantly increased going from the standard temperature range used at present (TO) to a much higher temperature range (Ti), which will vary according to the coat weight applied as can be seen in Table 1.

3. Changing the release coating application station from the silicone release coating station.

Figure 5:
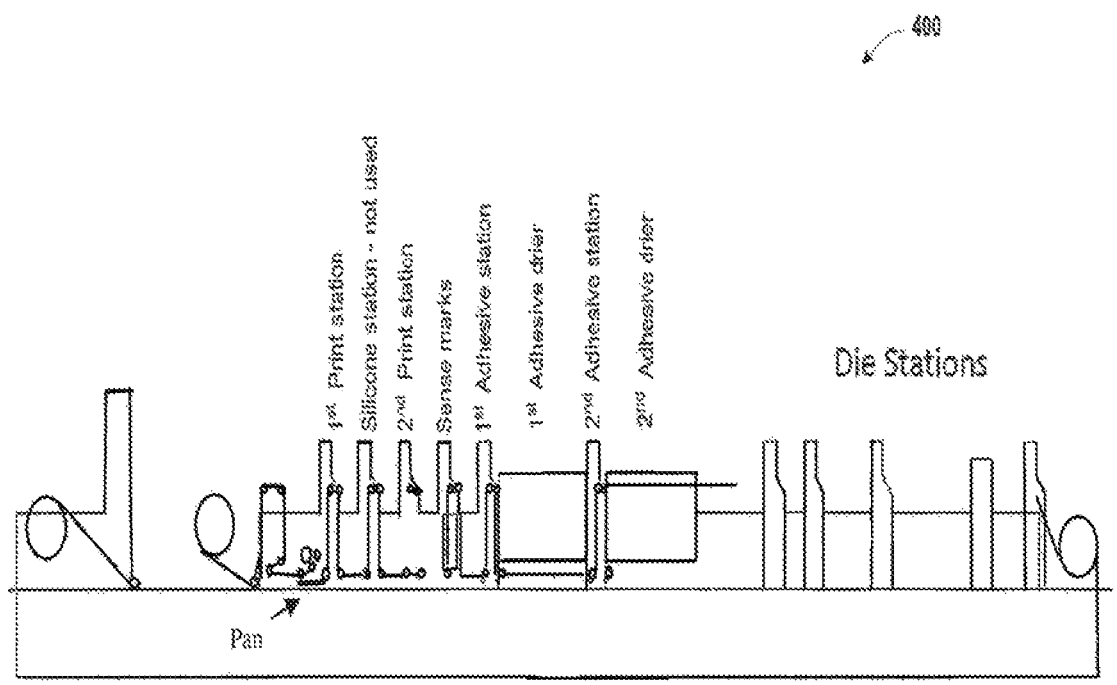
FIG. 5 is an example apparatus for applying a release coating, according to an example embodiment.

FIG. 5 is an example apparatus for applying a release coating, according to an example embodiment.

An example press 400 is illustrated. The example press is a modified flexographic or "flexo" printing press. Modification is necessary because flexo presses are normally intended for printing a dot matrix, not applying a uniform release coating. Such presses normally run products that have high solids and high viscosity, which dry quickly. The application of a water-based release coating in a normal press is very challenging because the press has limited drying capacity (dwelling time based on the speed of the press) and is not designed for water based coatings with low solids, which require longer dwell times.

The standard adhesives used at present are at 60% solids and require high coat weight to achieve adequate peel forces ranging from 1 lbf to 3 lbf. To achieve high coat weights with low adhesive viscosity between 500 to 3,000 cps it is necessary to do a two pass application. However, at high viscosity of around 30,000 cps only one pass application is required. Sense marks are also printed during this process and all is done in a one pass application.

Normally, the release coating would be applied in either of the two printing stations or the silicone station. However, the silicone station has UV energy which will not dry the water-based coating and neither the first nor the second print station has enough drying capacity to dry the coating. Therefore, in an embodiment, application of the release coating is moved from the silicone release coating station to the two adhesive stations since both of these have temperature zone driers required to dry the low solids water-based release coating. The water evaporation time of the adhesive should be increased because the adhesive will come into direct contact with the release coating.

It is noted, that the silicon station is not used in either the one-pass process or two-pass process for apply the release coating to the labels.

In an embodiment, of the one-pass process, the release coating is a formulation of the FC and starch.

Table 2 shows the adhesive temperature ranges needed to accelerate the drying. Since we are using a press to apply release coating rather than a coater, certain modifications have to be made to the process to coat uniformly and dry thoroughly the adhesive.

TABLE 2

Dryer Temperature Range for the Adhesive
Dryer Temperature
Range for

| T1 | T2 | T3 |
|---|---|---|
| 205 | 210 | 210 |
| 180 | 200 | 210 |
| 170 | 180 | 200 |
| 170 | 180 | 200 |
| 160 | 180 | 180 |
| 130 | 170 | 170 |
| 100 | 150 | 150 |
| 100 | 140 | 140 |

One or more of the following example modifications can be used to provide a uniform release coating to be applied on the press in the one pass process.

1. A radio frequency drier, infra-red drier, or adhesive drier may be added to print stations 1 or/and 2 to dry the release coating faster to avoid using the adhesive station and having to do a second pass on the press, first to add the release coating and then to add the adhesive.

2. A spraying roll may be added to the coating/print station (such as the first print station in the FIG. 5) to smooth the release coating out. The spraying roll runs opposite to the coating roll at a faster speed to smooth the release coating that has just been printed on the paper. When using a press to apply release coating, the press prints the release coating on the substrate using a dot matrix. To obtain a uniform release coating surface rather than a dot matrix, it is necessary to smooth the applied release coating with a roll to spread the release coating uniformly across the press. Its main function is to level the surface to obtain a uniform release coating surface layer.

3. A pan to catch the release coating formulation may be installed to prevent pre-wetting of the web. The release coating formulation has significantly less percentage solids than required to successfully operate the printer and as a result, the release coating drips onto the base paper web prior to it entering the print section where the release coating is applied. This adds extra moisture to the paper that has to be dried during the short dwelling time as it travels through the dryer.

Advantageously, this method provides the capability of replacing silicone with a water-based environmentally friendly release coating, applying the release coating with a press rather than with a coater, preventing wet interaction during drying of the water based adhesive and release coating, and preventing blocking/picking due to adhesive penetration through microscopic cracks in the release coating, and applying a uniform release coating to seal the surface. If the adhesive comes into contact when the release coating is wet, the release coating will delaminate from the top coat causing picking.

Figure 6:
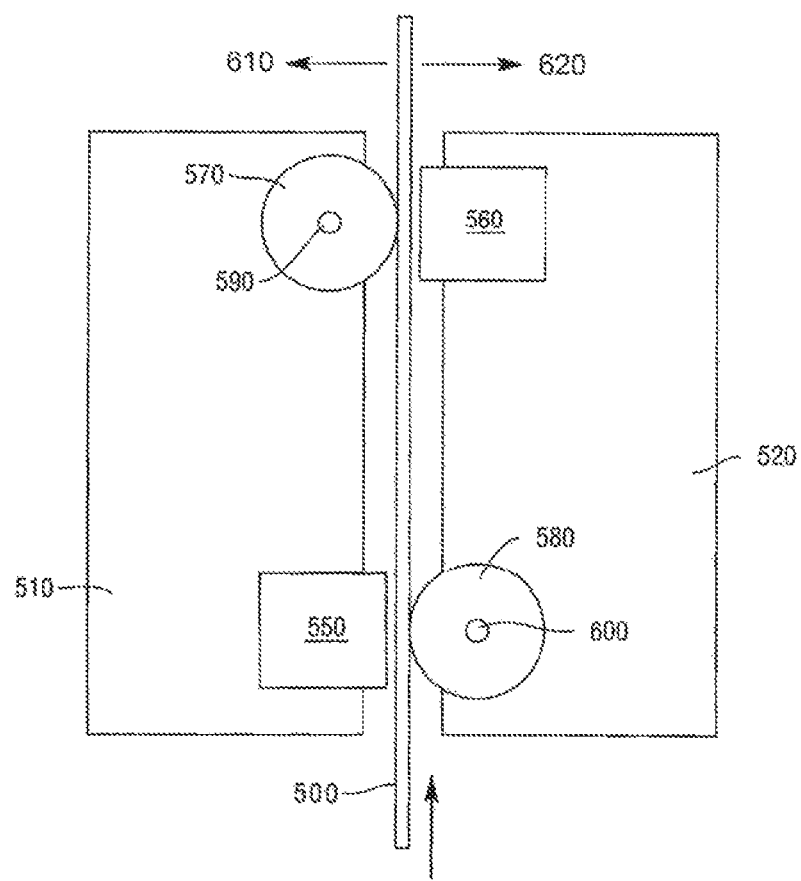
FIG. 6 is an example double-sided thermal printer for printing labels having a release coating, according to an embodiment.

FIG. 6 is an example double-sided thermal printer for printing labels having a release coating, according to an embodiment.

An example double-sided thermal printer includes a first print head assembly 510, a second print head assembly 520, and a motor. The first print head assembly 510 includes a first print head 550 and a first platen 570 rotatable about a first shaft 590. Similarly, the second print assembly 520 comprises a second print head 560 and a second platen 580 rotatable about a second shaft 600.

During operation of the double-sided thermal printer, the motor drives the first and second shafts 590 and 600 to turn the first and second platens 570 and 580. Accordingly, when a label 500 is fed into the printer, rotation of the first and second platens 570 and 580 pushes the label 500 in a direction indicated by a vertical arrow. As the label 500 passes through the printer, the first and second print heads 550 and selectively heat the two sides of label 500 to perform printing operations. More particularly, first print head 550 performs printing operations on a side of label 500 indicated by an arrow 610 and second print head 560 performs printing operations a side of label 500 indicated by an arrow 620.

In an embodiment, when the applied adhesive is applied to the substrate it can be a pressure-sensitive adhesive. In such a case, pressure can be applied to the adhesive at a customer's location for the receipt to adhere to customer items, such as, but not limited to: paper/foil wraps, cardboard boxes, clam shells, fries sleeves, cups, etc.

One now appreciates the environmental advantages to a low-solid fluorochemical release coating and other beneficial advantages enumerated above for such coating.

Furthermore, the release coating taught herein and above has a variety of other beneficial advantages of as such, but not limited to:
1. significantly improving print quality of thermally coated paper (conventional silicon release coatings can cause print failures);
2. writing and printing can be applied on top of the release coatings taught herein—this is in addition to the print layer (beneficial for applications, for example, date coding where a pencil can be used to circle the day of the week, the date, or any other information);
3. improving adherence of the release coating to any preprinted images that may be on the substrate (for example, silicon does not interact well with inks such that a paper with a preprinted logo for a customer or product brand—the release coating presented herein has no such negative interaction with preprinted images on the paper; additionally, such a logo or product brand can be printed after the release layer is applied (as discussed in 2 above)); and
4. improving the curing process of the release coating (for example, silicon uses UV to cure and UV interferes with water-based inks so to avoid this UV energy is reduced but a result of this is that the silicon does not cure properly and causes picking/blocking issues (UV interferes with sense marks, typically pre-printed on the same side as the adhesive, after going through UV, the sense marks show through the front-side thermal layer—with the release coating herein there is no need for UV energy so sense marks can be preprinted)).

Although the present invention has been described with particular reference to certain preferred embodiments thereof, variations and modifications of the present invention can be effected within the spirit and scope of the following claims.

The invention claimed is:

1. An adhesive label, comprising:
a substrate;
a release coating disposed on a front surface of the substrate, the release coating comprising a water miscible fluorochemical mixture, wherein a first component of the water miscible fluorochemical mixture anchors into the release coating while a second component of the water miscible fluorochemical mixture remains outside of the release coating; and
an adhesive disposed on a second surface of the substrate;
wherein the release coating is disposed on the front surface instead of a silicone release coating;
wherein the fluorochemical mixture includes a hydrophilic tail and a hydrophobic tail.

2. The adhesive label of claim 1 further comprising a thermal print layer under the release coating on the front surface.

3. The adhesive label of claim 2, wherein the substrate is adapted to prevent activation of the thermal print layer when heat is applied to the second surface.

4. The adhesive label of claim 3, wherein the thermal print layer is a thermal receptive coating suitable for thermal transfer when heat is applied to the front surface.

5. The adhesive label of claim 3, wherein the thermal print layer comprises thermal sensitive coatings adapted to change color upon activation of heat from direct thermal printing applied to the front surface.

6. The adhesive label of claim 1, wherein the adhesive is a water-based adhesive.

7. The adhesive label of claim 1, wherein the substrate is a thermochromic paper.

8. The adhesive label of claim 1, wherein the adhesive comprises adhesive patches deposited on the second surface.

9. The adhesive label of claim 1, wherein the adhesive is a heat-activated adhesive.

10. A label comprising:
   a substrate;
   a water-based release coating disposed on a first surface of the substrate, wherein the water-based release coating comprises a fluorochemical component, wherein the water-based release coating with the fluorochemical component comprises a first component that anchors into the water-based release coating and a second component that remains outside of the water-based release coating; and
   an adhesive coating disposed on at least a portion of a second surface of the substrate;
   wherein the water-based release coating is disposed to the front surface instead of a silicone release coating;
   wherein the fluorochemical component includes a hydrophilic tail and a hydrophobic tail.

11. The label of claim 10, wherein the substrate is adapted to prevent activation of a thermal print layer disposed on the first surface when heat is applied to the second surface.

12. The label of claim 10, wherein the substrate is a thermochromic paper.

13. The label of claim 10, wherein the water-based release coating with the fluorochemical component is a non-silicon-based release coating.

14. The label of claim 10, wherein the water-based release coating with the fluorochemical component is adapted to be applied to the first surface via a press instead of a coater.

15. The label of claim 14, wherein the water-based release coating with the fluorochemical component is adapted prevent wet interaction during drying on the press of the water-based release coating with the fluorochemical component on the first surface.

16. A label comprising:
   a substrate comprising a first side and a second side;
   a first coating and a water-based release coating disposed on the first side, wherein the water-based release coating comprises a fluorochemical component, wherein the water-based release coating is situated on top of the first coating, and wherein the water-based release coating with the fluorochemical component comprises a first component that anchors into the water-based release coating and a second component that remains outside of the water-based release coating; and
   an adhesive coating disposed on the second side;
   wherein the water-based release coating is applied to the first side instead of a silicone release coating;
   wherein the fluorochemical component includes a hydrophilic tail and a hydrophobic tail.

17. The label of claim 16, wherein the first coating is a thermal-transfer print coating.

18. The label of claim 16, wherein the first coating is a direct-thermal print coating.

19. The label of claim 16, wherein the fluorochemical component is water miscible and includes a C-6 backbone.

* * * * *